Apr. 3, 1923.

E. W. WOOD.
ANIMAL POKE FOR RESTRAINING STOCK.
FILED DEC. 22, 1922.

1,450,401.

Edwin W Wood
INVENTOR.

BY Loyal J. Miller
ATTORNEY.

Patented Apr. 3, 1923.

1,450,401

UNITED STATES PATENT OFFICE.

EDWIN W. WOOD, OF LOCKRIDGE, OKLAHOMA.

ANIMAL POKE FOR RESTRAINING STOCK.

Application filed December 22, 1922. Serial No. 608,553.

*To all whom it may concern:*

Be it known that I, EDWIN W. WOOD, a citizen of the United States, residing at Lockridge, in the county of Logan and State of Oklahoma, have invented a certain new and useful Improvement in Animal Pokes for Restraining Stock, of which the following is a specification, reference being had to the accompanying drawings.

My invention relates to improvements in animal pokes for restraining stock within enclosures, especially wire fences, and consists of a flexible member to be attached to a ring in the nose, or a halter, strap or rope on the head, neck, or other portion of an animal, and provided with a series of rigid bent links and hooks hanging depended from said flexible member, the hooks projecting outwardly and upwardly, and oppositely to each other so as to catch on the fence.

The object of the invention is to provide a device of this character so that stock wearing it is prevented from escaping from enclosures and prevented from going through the fence, or throwing their weight against the wires; also to provide a device of this character, of novel features, simple and inexpensive in its construction, quickly and easily applied and removed, and novel and effective in accomplishing its intended purpose.

Another object of the device is intended to effect the same purpose by attaching to a halter on the head, or a collar strap or rope around the neck of an animal sought to be confined within limits such as a pasture, corral or other enclosure.

The invention, novel features, details of construction and combination of parts and other objects of the invention will be hereinafter more particularly set forth, illustrated in the accompanying one page drawing, and pointed out in the appended claims.

Referring to the drawing forming a part of this application,

Like characters of reference designate like parts in all figures.

Figures 1, 2:
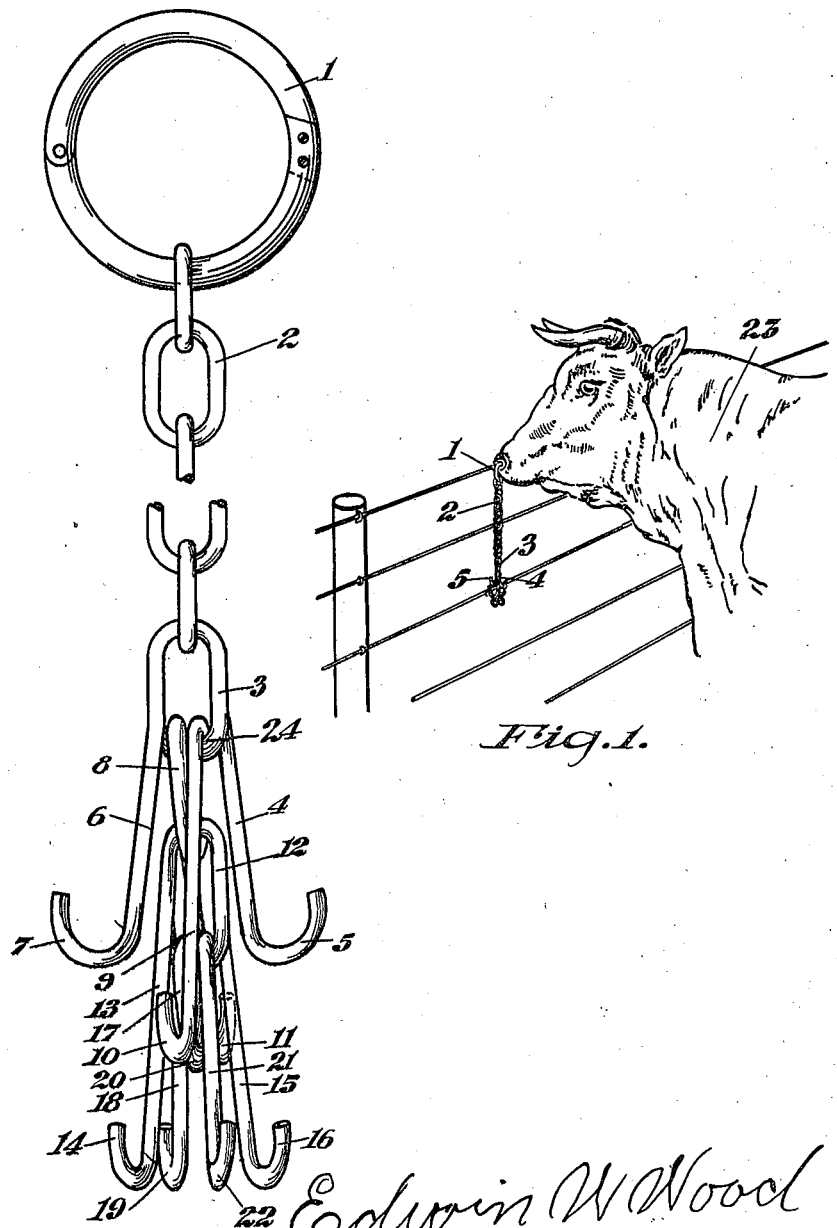
Figure 1 is a perspective view of the device, depended from the links and ring as applied to the cartilage or septum of an animal's nose.
Figure 2 is an assembled elevation view of the ring, links and the device.

The device may be depended from a suitable flexible member or from a chain 2 of any desired form and any desired number of links placed in a nose-ring 1, or any other suitable ring; the nose-ring is to be inserted in the nose of an animal 23, through the cartilage or septum, (Fig. 1). The device is preferably made of heavy rigid wire, so bent that each separate portion or member of the device as illustrated by 3, 4, 5, 6, 7 and 24, has two blunt pointed hooks 5, 7, bent outwardly and upwardly, and oppositely each other, and so bent in the middle as to form a link 3 having two thicknesses of the wire placed side by side 8 at the apex of said link and one thickness at the base, the two hooks extending below the base of said link approximately twice the length of the link. The second portion or member of the device 8, 9, 10, 11 is formed like the one above described, and is depended from the first by that portion of its link having two thicknesses of the wire side by side 8, 9, passing through the link of the portion immediately above where it has but one strand of said wire, 24 thereby keeping the hooks of the second member 10, 11, at right angles to the hooks of the first member, 5, 7, and comparatively rigid, and in combination with the length of the hooks as described below the base of the link, preventing the members from becoming tangled, and insuring their readiness to instant use. Preferably four members or portions are used 3, 4, 5, 6, 7; 24, 8, 9, 10, 11; 12, 13, 14, 15, 16; 17, 18, 19, 20, 21, 22, but as many like portions or members as are desired may be used. The wires on which are formed the hooks on the lowest member of the device are preferably shorter than the other portions or members, so as to cause the two hooks on the next to the lowest member and the two on the lowest member to be on the same level and the two members to be at right angles with each other.

From the description and accompanying drawing and the specifications the advantages of construction and operation will be apparent to those skilled in the art to which my invention pertains; but it will be understood that any modification within the scope of the claimed invention may be made in the construction without departing from the principle of the invention or sacrificing any of its advantages.

Having thus described the invention what is claimed, and desired to be secured by Letters Patent, is:

1. An animal poke as described comprising a plurality of longitudinally arranged members similarly formed composed of wire, or other suitable material, the ends forming hooks blunt at the beaks, bent outwardly and upwardly, and oppositely each other, said members bent so as to form a link intermediate their ends with two strands of wire side by side at the top and a single strand at the base of said link; said members so hung that each successive pair of hooks will be below and at right angles with the preceding pair.

2. An animal poke as described comprising a plurality of longitudinally arranged members composed of wire, or other suitable material, similarly formed, except the lowest member, the ends forming hooks blunt at the beaks, bent outwardly and upwardly, and oppositely each other, and said members bent so as to form a link intermediate their ends with two strands of wire side by side at the top and a single strand at the base of said link; said lowest member bent so as to make the link intermediate its ends smaller than the other links yet loose and free around the single strand of the link immediately above it, and the stems on which its hooks are bent made shorter than the other stems, making the four lower hooks on a common level, and each pair of hooks oppositely and at right angles with each other.

3. An animal poke as described comprising a plurality of longitudinally arranged members similarly formed composed of wire, or other suitable material, the ends forming hooks blunt at the beaks, bent outwardly and upwardly, and oppositely each other, and said members bent so as to form a link intermediate their ends with two strands of wire side by side at the top and a single strand at the base of said link; said links linked together so as to make the two strands side by side in the link of each succeeding member fit into the single strand of the link immediately above it in each instance, and so as to make the hooks of each successive member at right angles with the hooks of the member immediately above.

4. An animal poke as described comprising a plurality of longitudinally arranged members similarly formed, composed of wire or other suitable material the ends forming hooks blunt at the beaks, bent outwardly and upwardly, and oppositely each other, said members bent so as to form a link intermediate their ends with two strands of wire side by side at the top and a single strand at the base of said link, the links of said members fitted into each other so that the said two strands fit into the single strand of the link immediately above it, and the two stems with the hooks thereon are depended at right angles with the two stems and hooks immediately above.

5. An animal poke as described, comprising a plurality of longitudinally arranged members similarly formed, composed of wire or other suitable material, the ends forming hooks blunt at the beaks, bent outwardly and upwardly, and oppositely each other, said members bent so as to form a link intermediate their ends with two strands of wire side by side at the top and a single strand at the base of said link the links of said members fitted into each other so that the said two strands fit into the single strand of the link immediately above it, and the two stems with the hooks thereon are depended at right angles with the two stems and hooks immediately above, the whole depending from and in combination with a pending nose-ring, or halter, or with such nose-ring, or halter, and an ordinary chain.

EDWIN W. WOOD.